July 16, 1929. J. F. FALK ET AL 1,721,180
METHOD OF MAKING PANTS POCKETS FOR MEN'S CLOTHING
Filed April 20, 1928 3 Sheets-Sheet 1
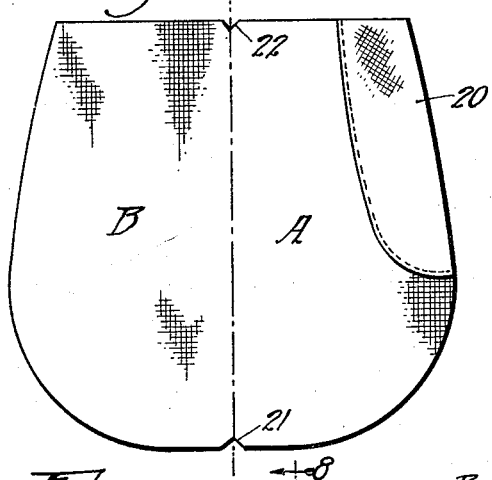
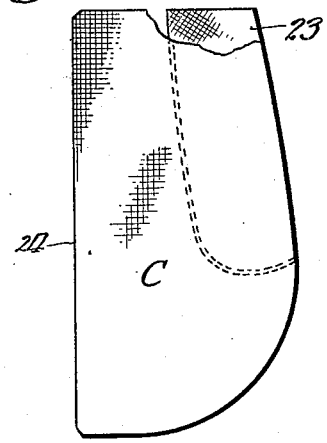
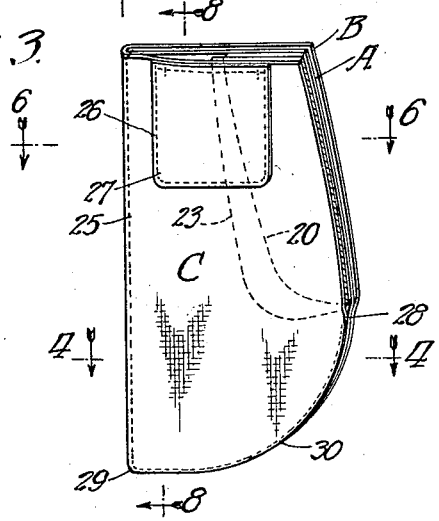
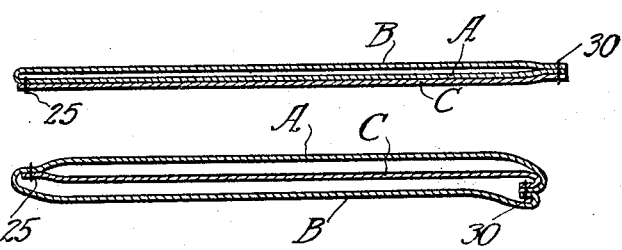
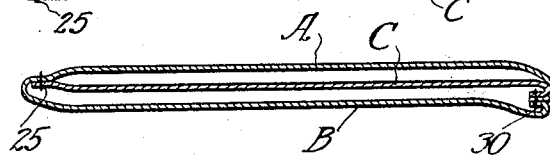
Inventors.
John F. Falk
Harry M. Sachartow
By Zabel & Banning Attys.

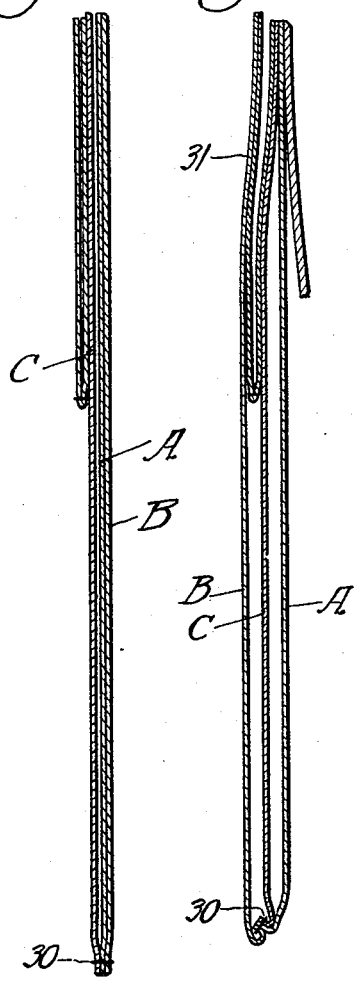
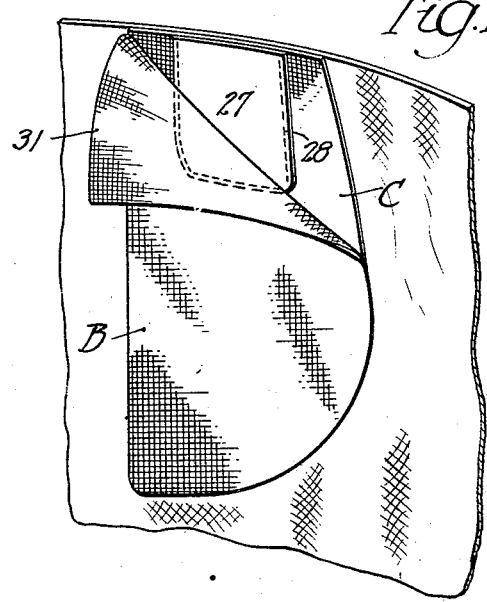

July 16, 1929.   J. F. FALK ET AL   1,721,180
METHOD OF MAKING PANTS POCKETS FOR MEN'S CLOTHING
Filed April 20, 1928   3 Sheets-Sheet 3
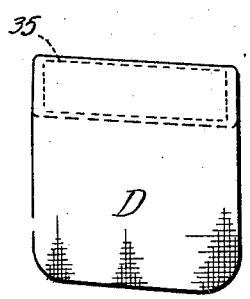
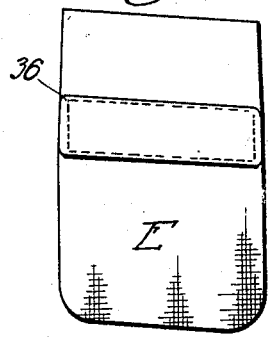
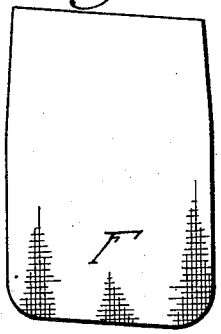
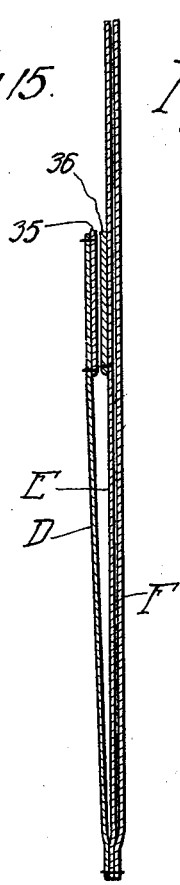
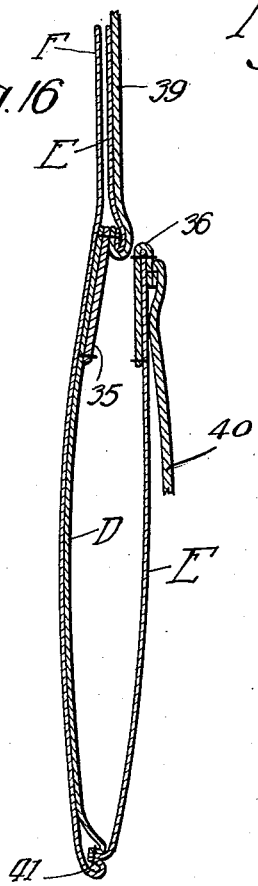
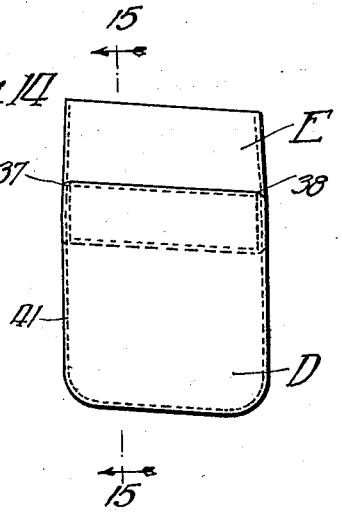
Inventors:
John F. Falk
Harry M. Sachartow
By Zabel & Banning Attys.

Patented July 16, 1929.

1,721,180

UNITED STATES PATENT OFFICE.

JOHN F. FALK AND HARRY M. SACHARTOW, OF CHICAGO, ILLINOIS.

METHOD OF MAKING PANTS POCKETS FOR MEN'S CLOTHING.

Application filed April 20, 1928. Serial No. 271,475.

Our invention relates to pockets for clothing and the like and a method of making the same.

It is a purpose of this invention to provide a method of making pants pockets which shall be simple in its various steps and which may be utilized without the necessity of employing expert labor in order to produce pockets of strong construction and pleasing appearance.

It is also a purpose of this invention to provide a method of constructing pockets for clothing whereby a reenforced pocket, exposing no seams to the eye of the observer after the pocket is completed and attached to the clothing, may be constructed.

More particularly it is an object of this invention to provide a method whereby a pocket may be constructed with a minimum number of operations most of which may be performed by unskilled labor and which when performed will produce a pocket having the pocket forming seams and raw edges of material covered so that they are not exposed either within the pocket or on the exterior thereof.

Other objects and advantages of the invention will appear as the description proceeds in connection with the accompanying drawings. However, it is to be distinctly understood that we do not intend to limit ourselves to the exact details shown and described, but that we intend to avail ourselves of all such modifications as would occur to one skilled in this art and as fall within the scope of the claims.

In the drawings:

Fig. 1 illustrates a pocket portion used in the construction of a side pocket for men's pants;

Fig. 2 illustrates a half pocket portion utilized in connection with the portion shown in Fig. 1;

Fig. 3 illustrates the pocket as it appears after certain steps of the method have been carried out;

Fig. 4 is a section on the line 4—4 of Fig. 3;

Fig. 5 is a similar section illustrating the appearance of the pocket after the turning operation;

Fig. 6 is a vertical section on the line 6—6 of Fig. 3;

Fig. 7 is a similar section illustrating the appearance of the pocket after the turning operation;

Fig. 8 is a section on the line 8—8 of Fig. 3;

Fig. 9 is a similar section illustrating the appearance after the pocket is turned;

Fig. 10 is a perspective view illustrating the appearance of the pocket as attached to the pants;

Figs. 11, 12, and 13 illustrate the sections forming a hip pocket for men's pants;

Fig. 14 is a side view of the assembled sections shown in Figs. 11, 12, and 13;

Fig. 15 is a section on the line 15—15 of Fig. 14; and

Fig. 16 is a similar section illustrating the appearance of the pocket after it is turned.

The various steps of making the side pockets will first be described with reference to the accompanying drawings. In Fig. 1 a full pocket portion consisting of the sections A and B is shown with the facing piece 20 secured thereto and as shown this portion is notched as at 21 and 22. The half pocket portion C which is substantially a duplicate of the portion A with the exception that the facing piece 23 is attached to the opposite side is placed over the portion A with the long straight edge 24 aligning with the notches 21 and 22. Portions A and C are then stitched together by means of the stitching 25 between the notches 21 and 22. This operation is carried out by what is generally known as the piecing section which also attaches the facing pieces 20 and 23.

The pocket pieces then go to the pocket making section. The pocket maker upon receiving the pocket portions with the sections A and C secured together by means of the stitching 25 secures the pocket to the material of the pants in the usual manner, that is, he connects the facings to this material and forms the finished openings between the facings to the space between the portions A and C. Portion B, however, remains free at this time with the exception of its being connected directly to the portion A and connected to the portion C by means of the seam 25 between A and C.

The next operation on the pocket is by the tacking section where the pockets are tacked at the upper and lower edges of the opening through the facings and the two pocket sections A and C, but not through the free section B.

The material then goes to the pocket sewing and turning section after the pants are seamed and the seams pressed and the pockets tacked. The operator in this section folds back the section B along the line between the notches 21 and 22 to the position shown in Fig. 3 and sews around the edge between the points 28 and 29 through the three portions A, B, and C as illustrated by the stitching 30. With the present modern machinery, this stitching may be done on a machine which sews and trims these edges at the same time.

After this operation the portion B is turned from its position as shown in Fig. 3 until it lies directly in front of the section C. The section through the pocket on the line 4—4 at this stage appears as shown in Fig. 5. That is, the stitching 30 lies between the sections B and C and the stitching 25, while it is exposed on the side next to section A, is completely hidden on the opposite side by the overturned portion of section B. The upper portion of the section B which is shown as turned back at 31 in Fig. 10 to illustrate the position of the watch pocket, may then be fastened down underneath the finishing material on the inside of the pants in any suitable manner and the pocket is thus completed.

It will be noted from the showing in Figs. 6 to 9 inclusive that the watch pocket lies between the portions B and C when the pocket is finished as shown in Fig. 9 and that on the side of the pocket facing away from the material of the pants, there is a double wall consisting of the portions B and C. It is well known that pants pockets usually wear out on this side next to the body of the wearer and this double reenforcement prevents such wearing since even though portion B or C should become worn through, the other portion would prevent anything placed in the pocket from falling out until such time as both these portions B and C were worn through. Also the raw edges of the material all lie between the sections B and C so that they are not exposed either in the interior of the main pocket which is between the sections A and C or on the exterior thereof.

The watch pocket, as is clearly shown in Figs. 9 and 10 being between the sections B and C, is doubly protected so that if anything drops through the watch pocket due to a hole being worn therein, it is not lost, but drops down between the portions B and C.

Referring now to Figs. 11 to 16 inclusive, the hip pocket for the pants is constructed from the sections D, E, and F. Sections D has on its back side a facing piece 35 and the section E has on its front side a similar facing piece 36 which are stitched thereto in the usual manner. In constructing the hip pocket sections D and E are placed together with the facing pieces thereon being in engagement.

These pieces are then attached by means of the facing pieces to the pants sections 39 and 40 in the usual manner as illustrated in Fig. 16. The only additional step by the pocket making section is to stitch the facings and sections D and E together as indicated at 37 and 38. The section F is then placed in the position shown in Fig. 15 on the pants side of the pocket and is stitched to the sections D and E along the opposite sides and the lower end as indicated by the stitches 41 in Fig. 14.

After this stitching has been done, section F is turned about the lower end thereof into the position shown in Fig. 16 after which the upper edges of the portions F and E may be finished in any suitable manner such as that commonly employed in attaching the pocket material to the pants.

Thus it will be seen that the portion F of the hip pocket faces away from the material of the pants and completely covers all of the seams utilized in forming the hip pocket.

The connecting seam between the portions D, E, and F which was indicated by the stitching 41 is as shown in Fig. 16 between the sections F and D in the finished article so that no raw edges are exposed either within the pocket or exteriorly thereof.

From the above description of the accompanying drawing it is thought that this method of making pants pockets will be clear to those skilled in the art and the advantages thereof readily apparent.

Having thus described our invention what we claim as new and desire to secure by Letters Patent is:

1. The method of forming a pocket which consists in placing a half pocket piece upon a full pocket piece, stitching one edge of half piece to the full pocket piece along the median line thereof, folding the full pocket piece along its median line to bring both halves thereof together on one side of the half piece, stitching the lower free edges to form a double pocket, and turning the pocket to bring the half piece and stitching between the two portions of the full piece.

2. The method of forming a pocket which consists in placing a half pocket piece upon a full pocket piece, stitching one edge of half piece to the full pocket piece along the median line thereof, folding the full pocket piece along its median line to bring both halves thereof together, stitching the lower free edges together to form two pockets and turning one of the pockets to bring the stitching along the lower edge thereof between the halves of said full pocket piece.

3. The method of forming a pocket which consists in providing two portions of pocketing material with facing pieces, placing said two portions and a third portion together with the facing pieces in contact, stitching the three portions together along the lower and side edges, and turning said third portion about the other two portions to bring the stitching between said third portion and said other two portions.

4. The method of forming a pocket for garments which consists in providing two portions of pocketing material with facing pieces, placing said two portions and a third portion together with the facing pieces in contact, attaching said facing pieces and said two portions to a garment, stitching the three portions together along the lower and side edges, and turning said third portion about the other two portions to bring the stitching between said third portion and said other two portions.

5. A pocket comprising front and back walls having facing pieces at the pocket opening on their adjacent faces and a reenforcing wall secured to said first named walls, the side and bottom edges of said walls being turned in between said reenforcing wall and said first named walls.

6. A pocket for garments comprising front and back walls having facing pieces at the pocket opening on their adjacent faces, and a reenforcing wall secured to said first named walls, the side and bottom edges of said walls being turned in between said reenforcing wall and said first named walls, and a small pocket secured to said first named walls and lying between one of said first named walls and said reenforcing wall.

In witness whereof, we hereunto subscribe our names this 9th day of April, A. D., 1928.

JOHN F. FALK.
HARRY M. SACHARTOW.